United States Patent
Bertucci et al.

(10) Patent No.: US 10,110,475 B2
(45) Date of Patent: Oct. 23, 2018

(54) RESTORATION METHOD FOR AN MPLS RING NETWORK

(71) Applicant: Telefonaktiebolaget L M Ericsson (publ), Stockholm (SE)

(72) Inventors: Simone Bertucci, Genoa (IT); Massimo La Mantia, Genoa (IT); Davide Massino, Genoa (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 219 days.

(21) Appl. No.: 14/775,703

(22) PCT Filed: Jul. 16, 2015

(86) PCT No.: PCT/EP2015/066334
§ 371 (c)(1),
(2) Date: Sep. 13, 2015

(87) PCT Pub. No.: WO2017/008862
PCT Pub. Date: Jan. 19, 2017

(65) Prior Publication Data
US 2017/0155575 A1     Jun. 1, 2017

(51) Int. Cl.
*H04L 12/703* (2013.01)
*H04L 12/42* (2006.01)
*H04L 12/723* (2013.01)

(52) U.S. Cl.
CPC .............. *H04L 45/28* (2013.01); *H04L 12/42* (2013.01); *H04L 45/50* (2013.01)

(58) Field of Classification Search
CPC .......... H04L 45/28; H04L 12/42; H04L 45/50
See application file for complete search history.

(56) References Cited

U.S. PATENT DOCUMENTS

2010/0162036 A1*  6/2010  Linden .................. G06F 11/181
                                                    714/4.11
2010/0287405 A1   11/2010  Soon
(Continued)

FOREIGN PATENT DOCUMENTS

CN           102891787 A      1/2013

OTHER PUBLICATIONS

PCT International Search Report, dated Feb. 24, 2016, in connection with International Application No. PCT/EP2015/066334, all pages.
(Continued)

*Primary Examiner* — Walter J Divito
(74) *Attorney, Agent, or Firm* — Leffler Intellectual Property Law, PLLC

(57) ABSTRACT

According to the present invention, there is provided a method for restoring a MultiProtocol Label Switching (MPLS) ring network in the event of a network link failure. The MPLS ring network comprises a path for traffic around the ring comprising a plurality of sequential Label Switched Paths (LSPs). The method comprises, at a network node in the MPLS ring network: detecting a failure along a network link traversed by a first LSP having an end point at the network node; in response to the detecting, encapsulating an Ethernet Ring Protocol (ERP) restoration message in a restoration pseudowire; and transmitting the restoration pseudowire within a second LSP over a subsequent network link. The method also comprises, at a network node in the MPLS ring network: receiving a first LSP comprising a pseudowire; detecting that the pseudowire is a restoration pseudowire comprising an Ethernet Ring Protocol (ERP) restoration message; and in response to the detecting, processing the ERP restoration message. There is also provided a network node for an MPLS ring network, and an MPLS ring network.

25 Claims, 8 Drawing Sheets

(56) References Cited

U.S. PATENT DOCUMENTS

| | | | |
|---|---|---|---|
| 2012/0250695 A1* | 10/2012 | Jia | H04L 12/42 370/400 |
| 2014/0136908 A1* | 5/2014 | Maggiari | H04L 12/462 714/712 |
| 2014/0211641 A1 | 7/2014 | Gohite et al. | |
| 2015/0036483 A1 | 2/2015 | Hassan | |
| 2015/0067074 A1* | 3/2015 | Ghosh Dastidar | H04L 51/38 709/206 |

OTHER PUBLICATIONS

PCT Written Opinion, dated Feb. 24, 2016, in connection with International Application No. PCT/EP2015/066334, all pages.
ITU-T G.8032/Y.1344, Telecommunication Standardization Sector of ITU, Series G: Transmission Systems and Media, Digital Systems and Networks, Jun. 2008, 46 pages.
Network Working Group, RFC 4385, S. Bryant et al., Pseudowire Emulation Edge-to-Edge (PWE3) Control Word for Use over an MPLS PSN, Feb. 2006, 12 pages.
Internet Engineering Task Force (IETF), RFC 5880, D. Katz et al., Bidirectional Forwarding Detection (BFD), Jun. 2010, 50 pages.

* cited by examiner

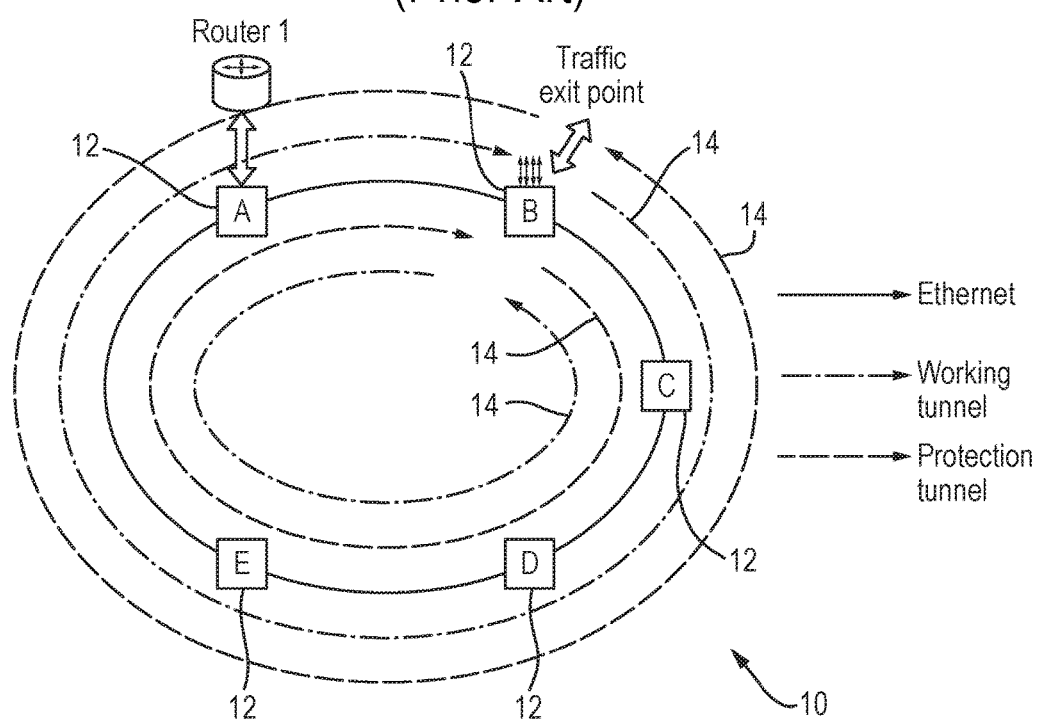

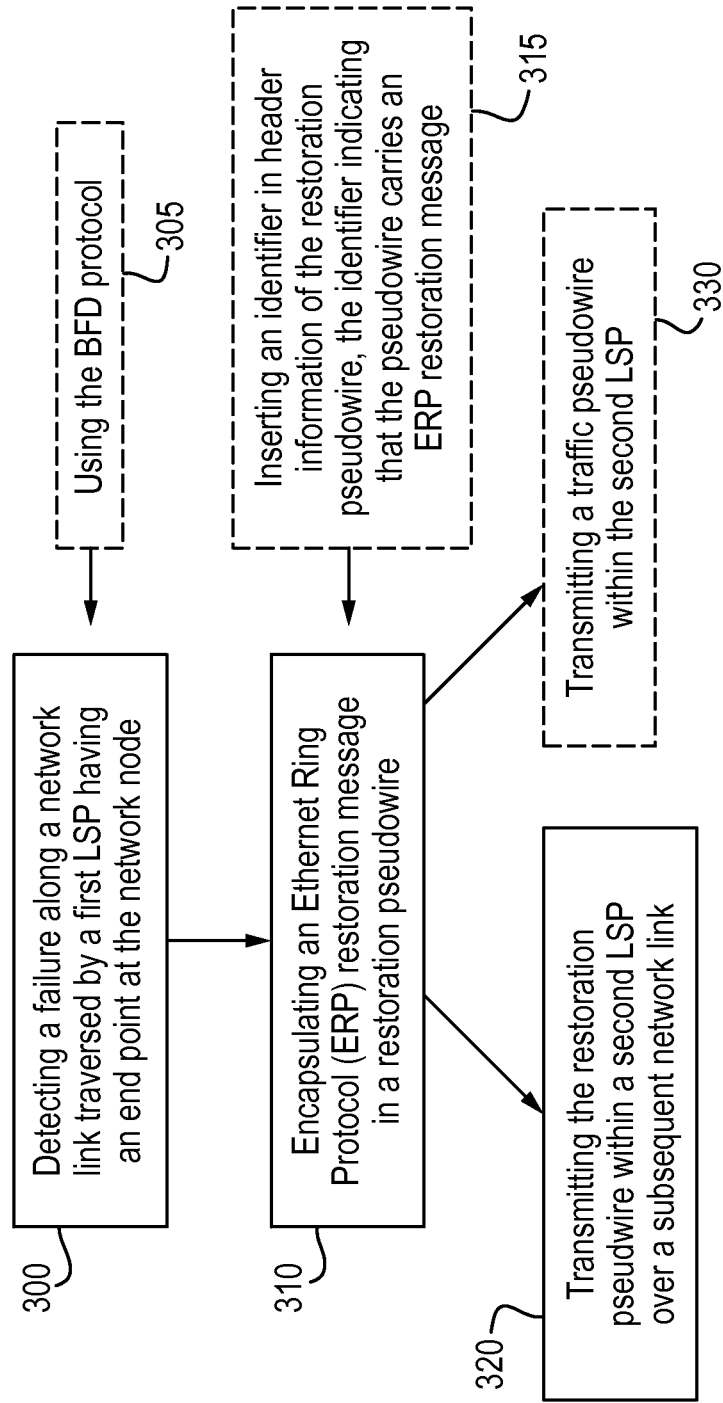

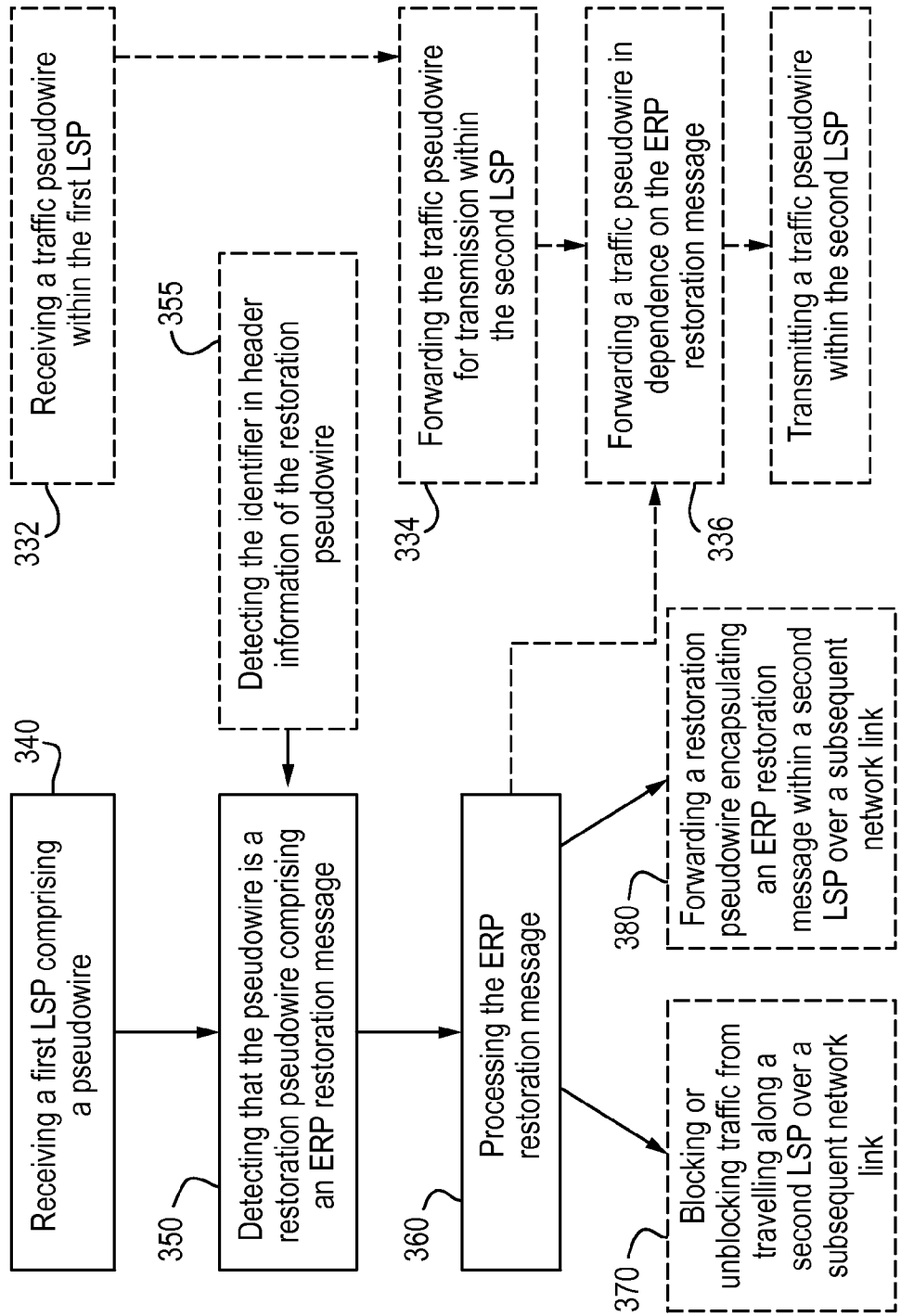

RESTORATION METHOD FOR AN MPLS RING NETWORK

TECHNICAL FIELD

The present invention relates to a method for restoring a MultiProtocol Label Switching (MPLS) ring network in the event of a network link failure. The present invention further relates to a network node for an MPLS ring network, and to a MPLS ring network.

BACKGROUND

Many service providers are interested in operating MPLS-TP (MultiProtocol Label Switching-Transport Profile) in ring topologies. MPLS ring topologies offer many advantages, including that they can be used with any underlying transport technology. However, service providers require a high level of survivability in the event of a network link failure. Such a network link failure may be a complete failure of a network link caused for example, where the network links comprise optical fibres, by an optical fibre cut or defect. Alternatively, the network link failure may be a failure of the network link to transport traffic at a desired performance level.

A way of providing restoration of an MPLS ring network in the event of a network link failure has been proposed to the Internet Engineering Task Force (IETF) standards body. The proposed system requires four Label Switched Paths (LSPs), which may also be referred to as "tunnels", to be set up for each traffic ingress/traffic egress node pair in the ring: a working LSP in the clockwise direction, a working LSP in the anticlockwise direction, a restoration LSP in the clockwise direction (which may also be referred to as a protection LSP) and a restoration LSP in the anticlockwise direction. FIG. 1 illustrates these LSPs 14 for one traffic ingress/egress node pair in an MPLS ring network 10. However, it will be appreciated that an MPLS ring network 10 will typically comprise several ingress/egress node pairs. Therefore many multiples of four LSPs may be required in order to provide protection for each of these connections. Thus, the proposed system may require a large number of LSP labels, which would create a heavy load on the management system. Furthermore, the proposed system operates such that, when a network link failure occurs, traffic may be doubled back or "wrapped" from a network node adjacent the network link failure. Thus, some traffic may traverse a network section twice, wasting network bandwidth.

SUMMARY

The applicant has appreciated that it would be desirable to provide an alternative method of restoring an MPLS ring network in the event of a network link failure.

According to the present invention there is provided a method for restoring a MultiProtocol Label Switching (MPLS) ring network in the event of a network link failure, wherein the MPLS ring network comprises a path for traffic around the ring comprising a plurality of sequential Label Switched Paths (LSPs). The method comprises, at a network node in the MPLS ring network, detecting a failure along a network link traversed by a first LSP having an end point at the network node. The method further comprises, in response to the detecting, encapsulating an Ethernet Ring Protocol (ERP) restoration message in a restoration pseudowire, and transmitting the restoration pseudowire within a second LSP over a subsequent network link.

There is also provided a method for restoring a Multi-Protocol Label Switching (MPLS) ring network in the event of a network link failure, wherein the MPLS ring network comprises a path for traffic around the ring comprising a plurality of sequential Label Switched Paths (LSPs). The method comprises, at a network node in the MPLS ring network, receiving a first LSP comprising a pseudowire. The method further comprises detecting that the pseudowire is a restoration pseudowire comprising an Ethernet Ring Protocol (ERP) restoration message, and, in response to the detecting, processing the ERP restoration message.

The Applicant has appreciated that by utilising Ethernet Ring Protocol (ERP) restoration messages in a MPLS ring network, in the manner specified, faster, more reliable and more efficient restoration of an MPLS ring network may be provided.

In an ERP restoration system, one network link is always blocked to traffic, whereby an impermissible traffic loop is prevented. This means that traffic in the MPLS ring network can be transmitted, and protected, by virtue of routing over a plurality of sequential LSPs as required, rather than over dedicated LSP tunnels between respective ingress/egress node pairs. Thus, advantageously, fewer LSP labels may be required to provide restoration for an MPLS ring network in comparison to the above described proposal. Thus the load on the management system may be reduced. Furthermore, traffic loop backs are not required in order to route traffic after detection of a network link failure, and thus more efficient use may be made of network bandwidth. In addition, multicast traffic may be transmitted more efficiently, since duplication of multicast traffic at an ingress network node for transmission in respective LSP tunnels to respective egress nodes is not required. Further, the restoration system may, advantageously, be used in multi-ring MPLS topologies, where two MPLS rings share a common ring link.

Moreover, the inventors have appreciated that in comparison to the use of ERP protection in Ethernet networks, by virtue of encapsulating the ERP restoration messages within LSP tunnels, faster and more efficient restoration may be provided, since each of the "transparent" intermediate nodes traversed by the LSPs do not need to process the ERP restoration messages, unlike in Ethernet networks. It can be considered that a "virtual" restoration network is overlaid onto the physical network topology. Only those nodes which are ingress or egress nodes for the protected traffic need to be intersected by the sequential LSPs, and to process the ERP restoration messages. Indeed, according to preferred embodiments of the present invention, multiple "virtual" restoration networks may be overlaid onto to a single physical network topology for respective traffic having different sets of ingress/egress nodes, so as to optimise network resources.

According to a preferred embodiment of the present invention, the detecting a failure along the network link (which may also be referred to as a network segment) traversed by the first LSP may comprise detecting the failure using the Bidirectional Forwarding Detection (BFD) protocol, for example as defined in RFC 5880. As those skilled in the art will understand, the BFD protocol effectively piggy backs on an LSP. Therefore, by using the BFD protocol, failure of the network segment traversed by the LSP may be detected quicker than for example monitoring the performance of each physical network node/link traversed by the LSP.

According to an embodiment of the present invention detecting a failure along the network link traversed by the first LSP may comprise detecting that the performance of the network link is below a threshold.

According to a preferred embodiment of the present invention, encapsulating the ERP restoration message in the restoration pseudowire may further comprise inserting an identifier in header information of the restoration pseudowire, the identifier indicating that the pseudowire carries an ERP restoration message. This facilitates a subsequent network node, at the other end of the LSP, detecting that the pseudowire is a restoration pseudowire which carries an ERP restoration message, and therefore that it needs to process the ERP restoration message. However, alternatively, it is possible that a protocol could be used to snoop the contents of each pseudowire, in order to detect whether the pseudowire is a restoration pseudowire. This alternative may however increase the processing load at each network node, particularly since, as will be explained further below, each network node may receive many traffic only pseudowires within each LSP as well.

According to a preferred embodiment of the present invention detecting that the pseudowire is a restoration pseudowire comprises detecting an identifier in header information of the pseudowire, the identifier indicating that the pseudowire carries an ERP restoration message.

Processing the ERP restoration message may comprise at least one of blocking or unblocking traffic from travelling along a second LSP over a subsequent network link.

Alternatively, processing the ERP restoration message may comprise forwarding the restoration pseudowire for transmission within a second LSP over a subsequent network link.

The restoration pseudowire may have a spoke configuration. The method may also comprise, further transmitting one or more traffic pseudowires within the second LSP. In some embodiments, this may comprise receiving a traffic pseudowire within the first LSP, and forwarding the traffic pseudowire for transmission within the second LSP. Preferably, the one or more traffic pseudowires have a spoke configuration. This may facilitate forwarding of the traffic pseudowires from one LSP to another, between provider network ports.

In a preferred embodiment of the present invention, the network node may route the traffic pseudowire and the restoration pseudowire over separate internal routing paths. Advantageously, this may prevent impermissible loops, where a traffic or restoration pseudowire received at a network node from a LSP is inadvertently transmitted by the network node back over the LSP, in the opposite direction.

In a preferred embodiment of the present invention, the network node may advantageously forward a traffic pseudowire in dependence on the ERP restoration message. This has the advantage that restoration of the traffic may be achieved faster than for example awaiting a notification from another part of the network that a change in routing of a traffic pseudowire disrequired.

In a preferred embodiment of the present invention, the second LSP is one of a plurality of LSPs having an end point at the network node, and the first LSP is associated with the second LSP. In this way, advantageously, many "virtual" restoration networks may be overlaid onto an MPLS ring network.

According to an embodiment of the present invention, the network node is at least one of an ingress network node for the traffic or an egress network node for the traffic.

The ERP restoration message may comprise a Ring Automatic Protection Switching (R-APS) message. The ERP restoration message may be as defined in ITU-T G8032.

In preferred embodiments of the present invention the first LSP and or the second LSP is bidirectional, whereby a pseudowire may be transmitted in either direction over the LSP.

According to the present invention, there is also provided a computer program product configured to, when run on a computer, perform any of the above methods. The computer program product may be a computer program stored on a computer readable medium. Alternatively, the computer program product may for example be a downloadable signal.

According to the present invention, there is also provided a network node for a MultiProtocol Label Switching (MPLS) ring network. The network node comprises a processor and a memory, wherein the processor is configured to detect a failure along a network link traversed by a first Label Switched Path (LSP) which is terminated at the network node. The processor is further configured to, in response to the detection, encapsulate an Ethernet Ring Protocol (ERP) restoration message in a restoration pseudowire; and transmit the restoration pseudowire within a second LSP over a subsequent network link.

According to the present invention, there is further provided a network node for a MultiProtocol Label Switching (MPLS) ring network. The network node comprises a processor and a memory, wherein the processor is configured to receive a first Label Switched Path (LSP) comprising a pseudowire, detect that the pseudowire is a restoration pseudowire comprising an Ethernet Ring Protocol (ERP) restoration message and, in response to the detection, process the ERP restoration message.

According to the present invention, there is further provided a MultiProtocol Label Switching (MPLS) ring network comprising a path for traffic around the ring. The path comprises a plurality of sequential Label Switched Paths (LSPs). The MPLS ring network further comprises a plurality of network nodes configured as described above.

BRIEF DESCRIPTION OF THE DRAWINGS

Preferred embodiments of the present invention will now be described, by way of example only, with reference to the accompanying drawings in which:

FIG. 1 illustrates a prior art restoration system for an MPLS ring network;

FIGS. 3a and 3b are flow charts showing methods according to embodiments of the present invention;

DETAILED DESCRIPTION

Figure 2B:
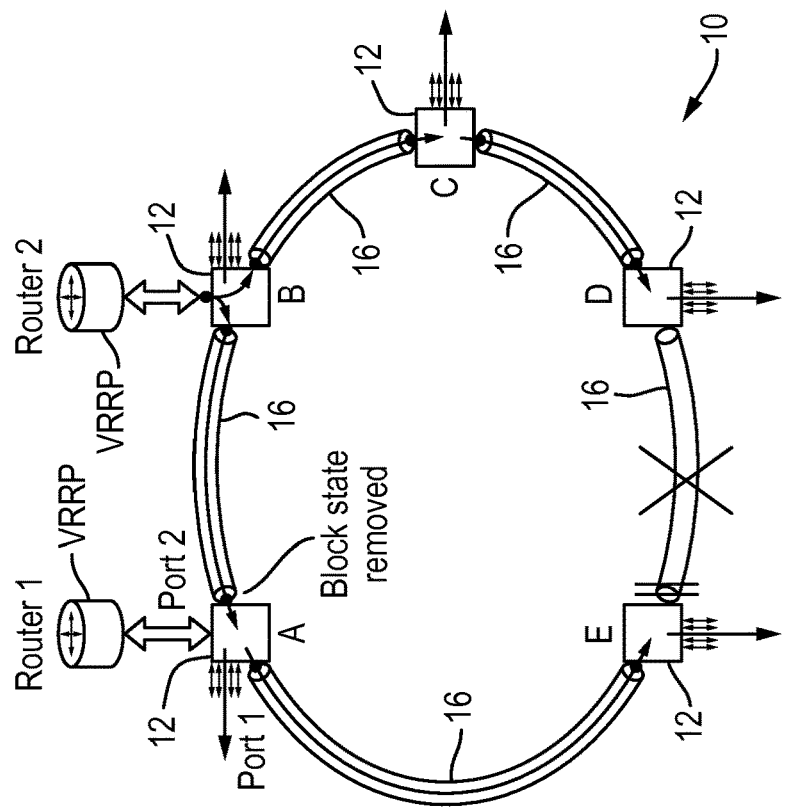
FIGS. 2a and 2b illustrate the operation of an MPLS ring network according to a preferred embodiment of the present invention, prior and after the event of a network link failure.
Figure 2A:
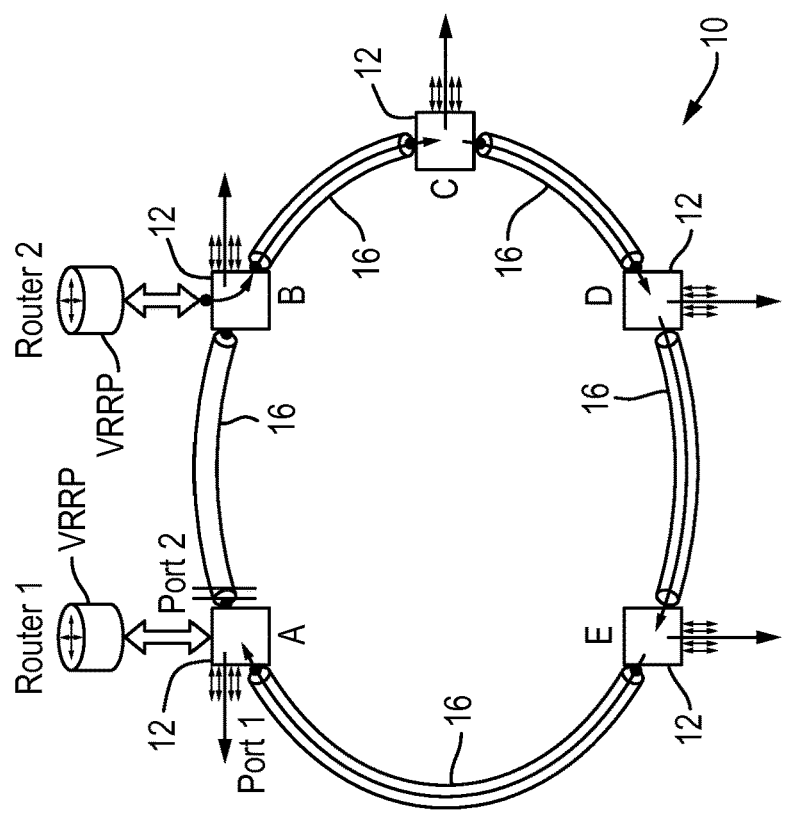

FIGS. 2a and 2b illustrate an MPLS ring network 10 according to a preferred embodiment of the present invention before and after a network link failure. FIG. 2a illustrates the MPLS ring network 10 before a network link failure. FIG. 2b illustrates the MPLS ring network 10 after the network link failure.

The MPLS ring network 10 comprises a plurality of network nodes 12, not all of which are shown in FIGS. 2a and 2b. Each of the network nodes 12 is coupled to its adjacent network nodes 12 by respective links. These links may for example but not exclusively comprise optical fibres.

As will be understood by those skilled in the art, MPLS is a layer 2/3 technology according to the OSI (Open Systems Interconnection) model. MPLS may be used with any underlying data link/physical transport technology, including but not limited to Ethernet.

FIGS. 2a and 2b illustrate the MPLS ring network 10 at an MPLS level of abstraction. The network links shown interconnecting network nodes 12 (A, B, C, D and E) are Label Switched Paths (LSPs) 16. These LSPs 16 may be referred to as "tunnels". As will be understood by those skilled in the art, each LSP 16 traverses a plurality of network nodes/network node links (not shown), which can be considered "transparent". At each of these intermediate network nodes, the LSP is simply forwarded based on its label. These nodes do not process the data carried within the LSP.

LSPs 16 may be set up or configured, for example by a Resource Reservation RSVP protocol, as will be understood by those skilled in the art.

LSPs 16 are point-to-point LSPs. Each LSP 16 has a first end point at one of the network nodes A to E and a second end point at an adjacent one of the network nodes A to E. The LSPs 16 are arranged sequentially around the ring, over respective, sequential, network segments. In this way the LSPs 16 provide a path for traffic around the ring. In this example, there are five LSPs 16, and correspondingly five network nodes 12 intersected by the LSPs 16. However, there may be more or fewer LSPs 16.

In this example, each of the LSPs 16 is bidirectional. This means that traffic may be transmitted in either direction through the LSPs 16, and thus clockwise or anticlockwise around the ring.

In this example, each of the networks nodes A to E, intersected by the sequential LSPs 16, is an ingress and or an egress network node for traffic which is to be, or has been, transmitted around (at least a portion of) the ring.

Each of the network nodes A to E comprises three interfaces: an east interface, for receiving/transmitting one of the LSPs 16; a west interface, for receiving/transmitted a second one of the LSPs 16; and a third interface, which in this example is a customer interface. The third interface may be configured to receive traffic to be transmitted over the MPLS ring network 10 and or drop traffic which has been received over the MPLS network 10. It is advantageous for network nodes A to E only to include ingress and or egress network nodes for the traffic, so as to optimise the routing speed, and the restoration speed, of the traffic in the MPLS ring network 10. However, a network operator may wish to include one or more network nodes which are not currently ingress and or egress network nodes for traffic in the set of nodes 12 intersected by the sequential LSPs 16, such that these network nodes may be easily upgraded to ingress and or egress network nodes in the future.

In an Ethernet Ring Protection (ERP) restoration system, at any time, at least one of the links in the ring is blocked to traffic, in order to prevent impermissible traffic loops. ERP restoration is defined in ITU-T G.8032. One particular link is configured as a Ring Protection Link (RPL) in order to enforce this requirement. The RPL belongs to only one node in the ring, which is called the RPL owner.

In the example shown in FIG. 2a, network node A is the RPL owner and, in this example, the network link or segment traversed by LSP 16, between network node A and network node B, is the RPL. This network link, in contrast to in Ethernet, as explained above, in fact comprises a plurality of "transparent" network nodes/network node links (not shown).

FIG. 2a shows, by way of example only, traffic entering the MPLS ring network 10 at node B. In this example, network node B receives traffic to be transmitted over the MPLS ring network 10 at its customer interface. Network node B is configured to transmit the traffic in one or more pseudowires within an LSP 16 to an adjacent network node: network node A or C. However, given that, in the example of FIG. 2a, network node A blocks traffic from travelling over the link between network node B and A. Network node B, in this example, transmits the one or more traffic pseudowires to network node C within a first LSP 16. Thus, in this example, the traffic pseudowire(s) travel clockwise around the ring.

Network node C receives the one or more traffic pseudowires from the first LSP 16. In this example, network node C may drop one of the traffic pseudowires, and forward the other traffic pseudowire(s) for transmission within a second (or further) LSP 16 over a subsequent network link, in this case to network node D. This process may be repeated, in this example by each of network nodes D and E. Alternatively, where at least one of the one or more traffic pseudowires comprises multicast traffic, network node C may receive at least one traffic pseudowire from the first LSP 16, duplicate the traffic carried in the traffic pseudowire 16, and drop the duplicated traffic. Network node C may further forward the at least one traffic pseudowire for transmission with the second LSP 16, over the subsequent network link to network node D. This process may be repeated by network nodes D and E.

It should be appreciated that, although not shown, traffic may also be entering the MPLS ring network 10 at one or more other of the network nodes A to E.

Network nodes A to E may determine whether to drop and or to forward a traffic pseudowire received by the respective network node, for example using a snooping protocol such as the Internet Group Management Protocol (IGMP). Such a snooping protocol may, for example, allow the network node A to E to determine the addressee of the traffic pseudowire, such that the network node A to E can process and or forward the traffic pseudowire appropriately.

The traffic pseudowires may be considered to be communication channels. In preferred embodiments, the traffic pseudowires have a spoke configuration, in order to facilitate forwarding an incoming traffic pseudowire received from a first LSP 16 (for example at one provider network port) for transmission within a subsequent LSP 16 (for example from another provider network port). The traffic pseudowires may, for example, be as defined in the IETF RFC standards.

FIG. 2b illustrates the MPLS ring network 10 in the event of a network link failure. In this example, the network link which has failed is the link traversed by the LSP 16 between network node E and network node D. This failure may be a complete failure of the network link, caused for example by an optical fibre cut or defect. Alternatively, the failure may be a failure of the network link to provide a desired performance level, for example an acceptable traffic transmission speed or error rate.

FIGS. 3a and 3b are flow charts showing methods taking place at a network node 12 in an MPLS ring network 10, in order to restore the MPLS ring network 10 in the event of a network link failure, according to embodiments of the present invention. It should be appreciated that at least some of the "steps" shown in FIGS. 3a and 3b may be performed simultaneously, or in a different order from that shown.

At step 300, a network node 12 detects a failure along a network link traversed by a first LSP having an end point at the network node 12. In the example shown in FIG. 2b this network node 12 may be network node E and or D. Advantageously, detecting this failure may comprise, at step 315, using a continuity check mechanism, for example the MPLS-TP BFD (Bidirectional Forwarding Detection protocol), to monitor the status of the LSP 16. BFD protocol messages are piggy-backed onto LSPs, and therefore may allow a failure of the LSP 16 traversing the link, and thus the failure of the link, to be detected more quickly than other methods. As indicated above, the detecting 300 may comprise detecting that the performance of the network link is below a performance threshold.

At step 310, in response to the detecting 300, the method further comprises encapsulating an Ethernet Ring Protocol (ERP) restoration message in a restoration pseudowire. The ERP restoration message, which may be defined according to ITU-T G.8032, may comprise a Ring Automatic Protection Switching (R-APS) message. Thus, the message may include a command to a particular network node (A to E) to unblock, or block, a network link.

At step 320, the method further comprises transmitting the restoration pseudowire within a second LSP over a subsequent network link.

Thus, in the example shown in FIGS. 2a and 2b, if for example network node E detects the failure of the link (LSP 16) interconnecting nodes E and D, network node E may transmit the restoration pseudowire within LSP 16 to network node A (the RPL owner), in a clockwise direction around the ring. Similarly, network node D may detect the failure of the link (LSP 16) interconnecting nodes E and D, and transmit a restoration pseudowire within LSP 16 to network node C. Network nodes D and E also block traffic from travelling along failed LSP 16 therebetween.

Figure 4:
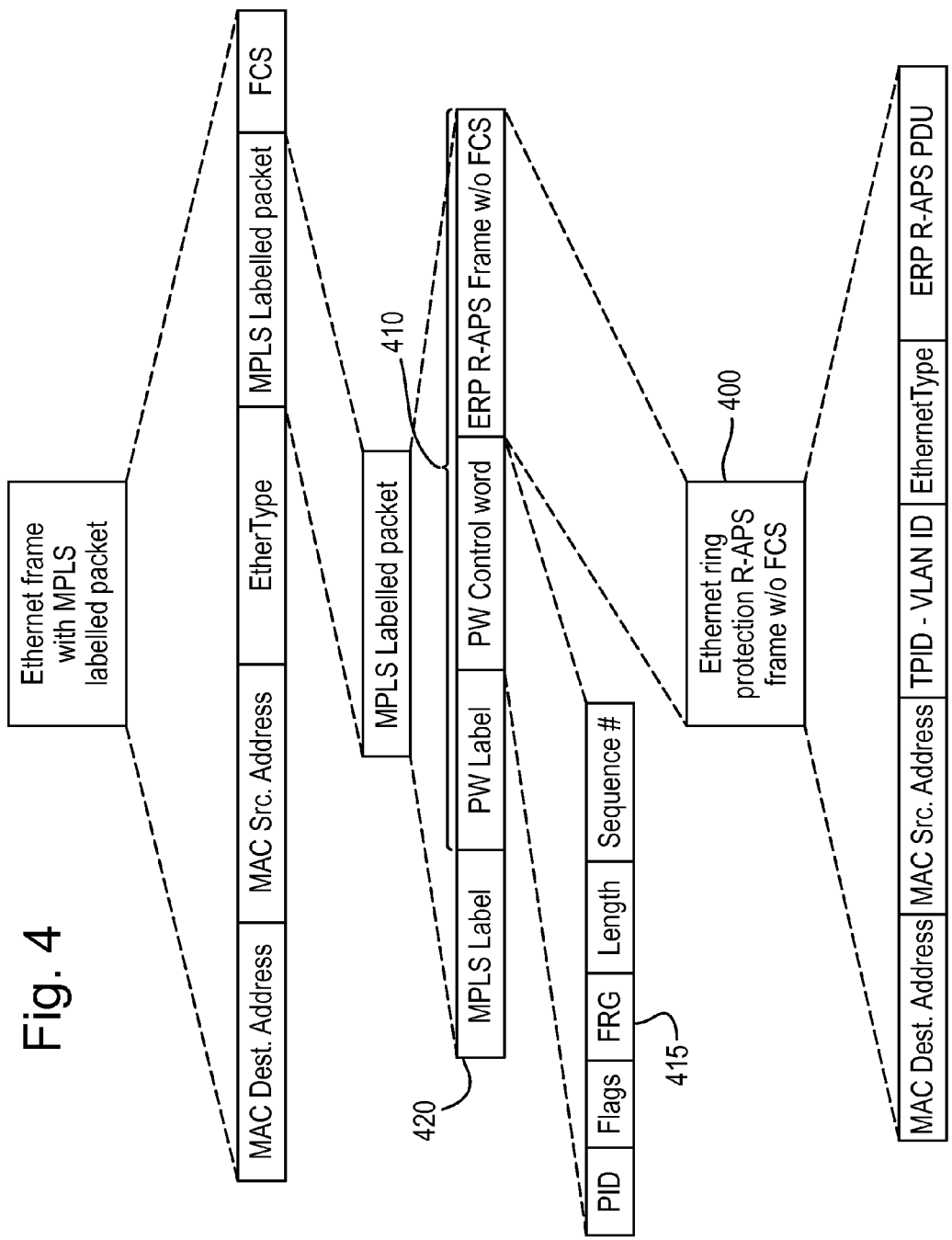
FIG. 4 shows header information of a pseudowire according to a preferred embodiment of the present invention.

By way of example only, FIG. 4 illustrates an example of a restoration pseudowire 410. Preferably, the restoration pseudowire 10 has a spoke configuration. It is seen that, in this example, an ERP-APS restoration message 400 is encapsulated within the restoration pseudowire 410. The ERP restoration message 400 comprises an ERP-APS PDU (Packet Data Unit). The ERP restoration message 400 also comprises a MAC destination address. The ERP restoration message 400 further comprises a MAC source address. In this example, the restoration pseudowire 410 further comprises header information. In this example, this header information includes "PW Label" and "PW Control Word".

As will be understood by those skilled in the art, in order to transmit the restoration pseudowire within a particular LSP, the corresponding MPLS label 420 is affixed to the restoration pseudowire.

According to a preferred embodiment of the present invention, step 310, may comprise inserting an identifier in header information of the restoration pseudowire, the identifier indicating that the pseudowire carries an ERP restoration message. Advantageously, this may facilitate identification of the pseudowire as a restoration pseudowire, carrying a restoration message, by a subsequent network node. With reference to the example in FIG. 4, this identifier may, for example, be inserted into the "PW control word" information shown at 415. The "PW control word" includes a number of fields including a PID (Pseudowire ID) field. According to the existing RFC 4385 standard, the values for this field are "0", which means Generic PW MPLS Control Word, and "1", which means PW associated Channel. In a preferred embodiment of the present invention, this field may be set to "2", in order to indicate that the pseudowire carries an ERP restoration message. However, it should be appreciated that an identifier, indicating that the pseudowire is a restoration pseudowire, may be included or inserted elsewhere in the pseudowire header information.

At step 340, a further network node 12 in the MPLS ring network 10, receives a first LSP comprising the (restoration) pseudowire. The method further comprises, at step 350, the network node 12 detecting that the pseudowire is a restoration pseudowire comprising an Ethernet Ring Protocol (ERP) restoration message. This step may comprise 315 detecting an identifier in header information of the pseudowire, the identifier indicating that the pseudowire carries an ERP restoration message, as explained above.

In the example shown in FIG. 2b, this further network node 12 may, as noted above, be network node A. Network node A is in this example the RPL owner, and is currently blocking traffic from travelling over the length of LSP 16 between nodes A and B. This further network node 12 may also be network node C.

At step 360, in response to the detecting, the method further comprises the further network node 12 processing the ERP restoration message, in accordance with ITU T G.8032. This, depending on the content of the ERP restoration message, and optionally the status of the further network node 12, may comprise: at 370, at least one of unblocking or blocking traffic from travelling along a second LSP over a subsequent network link; at 380 forwarding the restoration pseudowire for transmission within a second LSP over a subsequent network link.

Thus, in the example shown in FIG. 2b, where the further network node 12 is network node A, network node A may read the ERP restoration message, and unblock traffic from travelling over the LSP 16 connecting nodes A and B. This means that, since the failed LSP 16 (or network link) between nodes E and D is blocked to traffic, there is still one blocked link in the ring even once the failed link is restored, to prevent impermissible loops, and yet traffic may still reach all of the network nodes A to E in the ring.

In this example, the ERP restoration message is sent directly from the node E 12 detecting the fault to network node A, the ERP owner. However, in other examples, the ERP restoration message may be sent to the destination node via a number of other network nodes A to E. For example, network node C in this example may be such an intermediate network node. In this case, each intermediate network node A to E may process the ERP restoration message, by determining that the message is not addressed to it, and forwarding the restoration pseudowire for transmission in the next LSP 16, further around the ring.

All of the network nodes A to E may be informed of the new configuration of the MPLS ring network 10.

Thus, advantageously, restoration of the MPLS ring network 10 may be achieved.

It should be appreciated that, whilst the sending and receiving of ERP restoration pseudowires in response to the detection of a network failure has been described above. In accordance with ITUT-T G.8032, ERP messages may travel around the ring, even when no active failures are occurring.

FIG. 2b illustrates an example operation of the MPLS ring network 10 after restoration of the network 10.

In this example, after restoration of the MPLS ring network 10, network node B similarly transmits one or more traffic pseudowires around the ring. However, network node B now transmits one or more traffic pseudowires through a first LSP 16 to network node C, in a clockwise direction around the ring. Network node B also transmits one or more traffic pseudowires through a second LSP 16 to network node A, in an anticlockwise direction. At least one of the traffic pseudowires is thus received by network nodes A and E and C and D, as before the failure of the network 10.

Referring again to FIG. 3, steps 330 and 380 may further comprise transmitting a traffic pseudowire within the second LSP. This traffic pseudowire may be transmitted simultaneously, prior to, or subsequently, to the restoration pseudowire. For example, the method shown in FIG. 3b may further comprise, at 332, receiving a traffic pseudowire within the first LSP, and at 334 forwarding the traffic pseudowire for transmission within the second LSP. In this example, step 334 comprises forwarding the traffic pseudowire and the restoration pseudowire over separate internal routing paths, in order to prevent impermissible loop backs. Thus, it can be considered that the "control plane" is separate from the "traffic plane".

In a preferred embodiment of the present invention, the network node 12 forwards, at step 336, a traffic pseudowire in dependence on the ERP restoration message. For example, the network node 12 may change a predetermined routing direction of the traffic pseudowire in response to the ERP restoration message.

In the above, a single "virtual" restoration network has been described. However, it should be appreciated that several "virtual" restoration networks may be overlaid onto a single MPLS ring network 10. Each of these "virtual" restoration networks may have different sets of network nodes 12 which are coupled by respective, sequential LSPs 16. The different sets of network nodes 12 may comprise some common network nodes 12, which are included in both sets. Thus, in a preferred embodiment of the present invention, the second LSP, referred to above, may be one of a plurality of LSPs having an end point at the respective network node 12. In this case, the first LSP is associated with the second LSP.

Figure 5A:
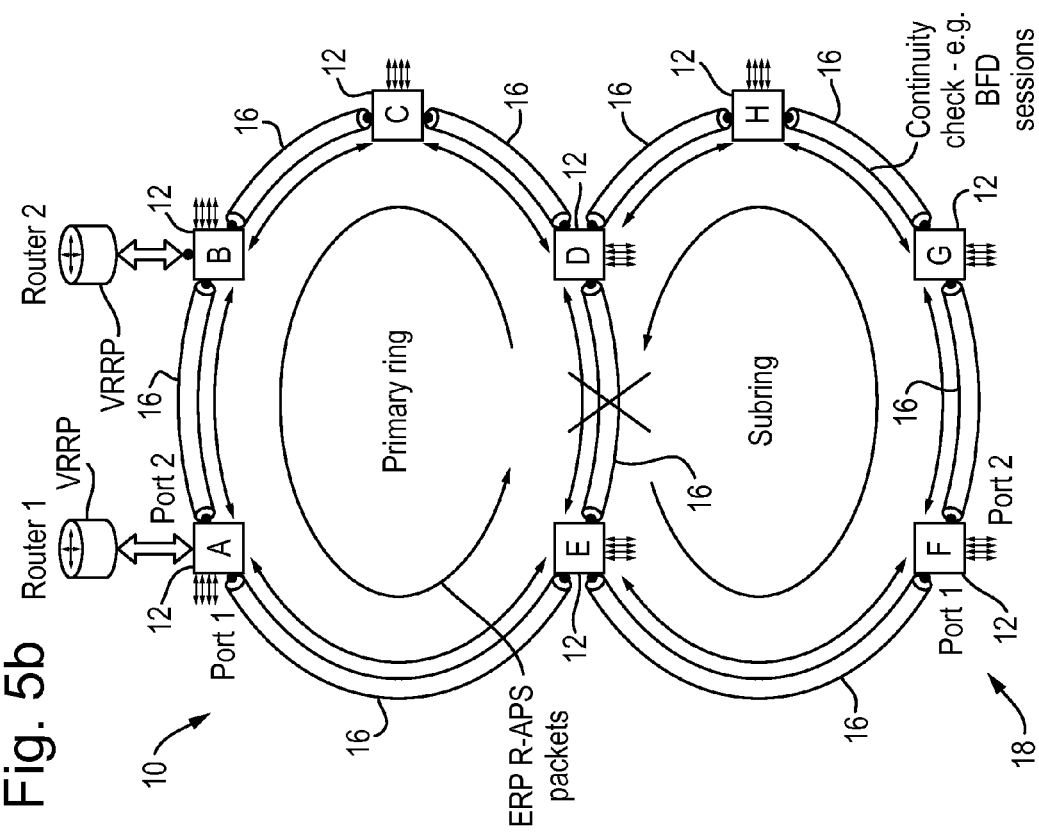
FIGS. 5a and 5b illustrate an example where the MPLS ring network is coupled to a further MPLS ring network according to a preferred embodiment of the present invention.
Figure 5B:
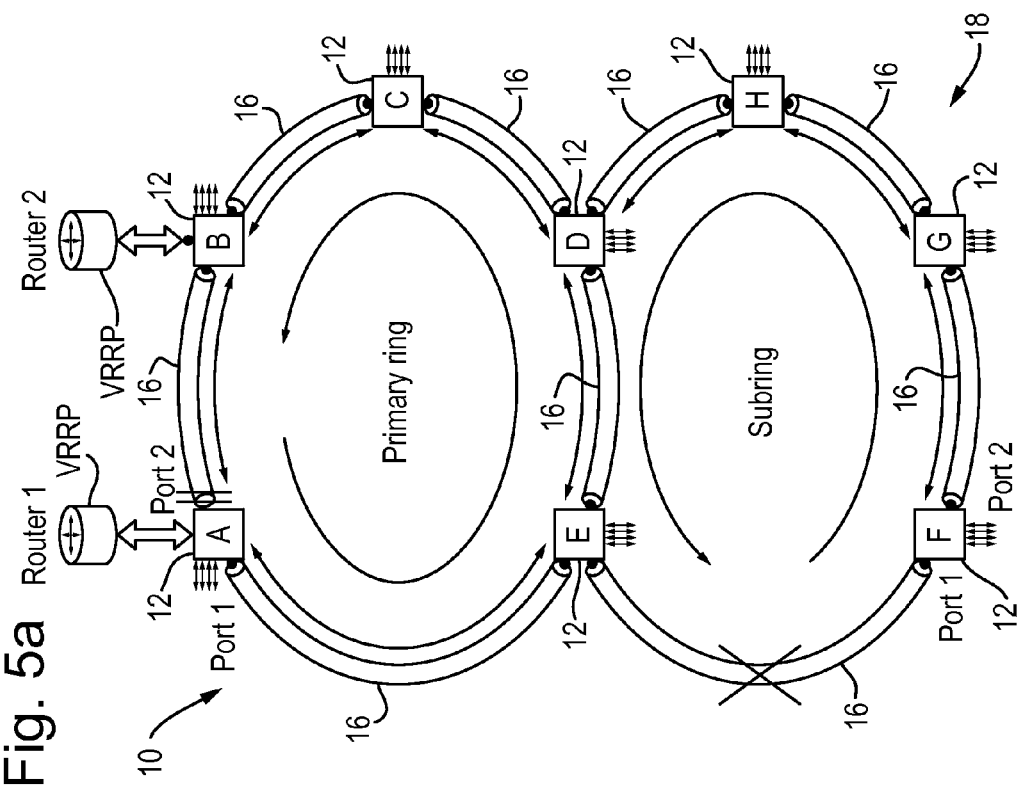

FIGS. 5a and 5b illustrate an example of an embodiment of the present invention applied to a multi-ring MPLS network 10. In this example, MPLS ring network 10 described above, which may be referred to as the primary ring, is coupled to a further MPLS ring network 18, which may be referred to as a subring. MPLS ring networks 10 and 18 share a common ring link (LSP 16), in this example the link between network nodes E and D. Each of the ring networks 10, 18 may operate independently as described above. For example, in MPLS ring network 18, network node F may be the RPL owner for that network. If as shown in FIG. 5a, a failure occurs in a link which is part of MPLS ring network 18, MPLS ring network 18 may be restored according to the methods described above. In the event that the common network link fails, as shown in FIG. 5b, then both MPLS ring networks 10, 18 will be restored according to the methods described above.

Figure 6:
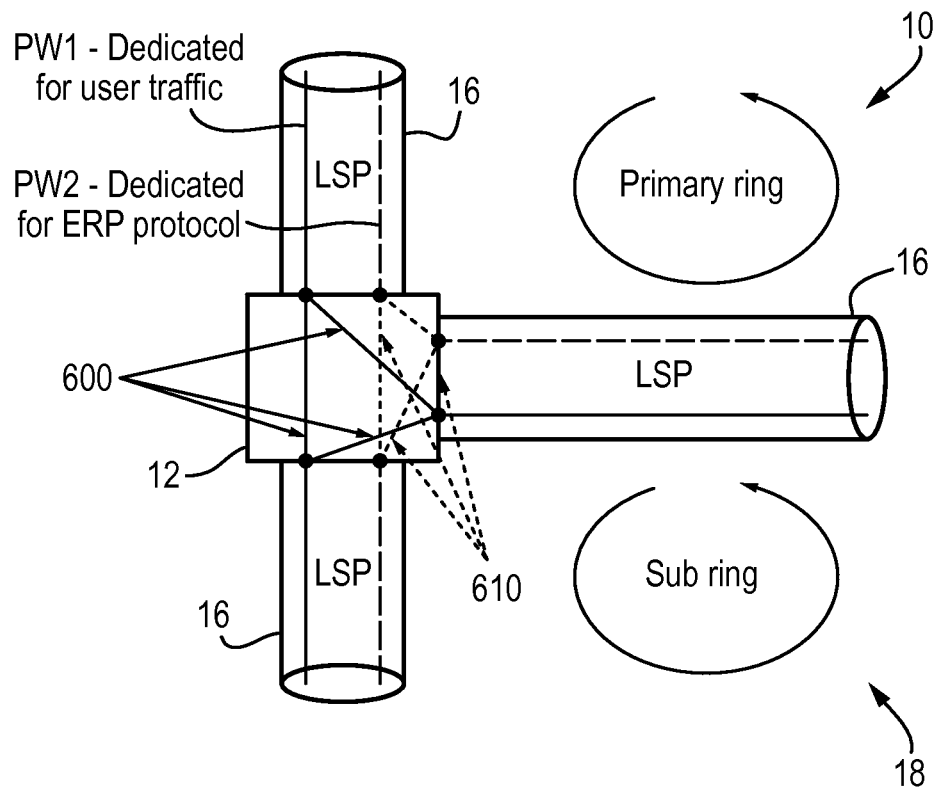
FIG. 6 illustrates a configuration of a network node which is part of both the MPLS ring network and the further MPLS ring network, according to a preferred embodiment of the present invention.

FIG. 6 illustrates an internal configuration of one of the network nodes 12 which is part of both of the MPLS ring networks 10, 18. This network node has three interfaces: one coupled to a network link in the first MPLS ring network 10, one coupled to a network link in the second MPLS ring network 10, and a further interface coupled to the network link shared by the two MPLS ring networks 10. The network node 12 comprises a first internal routing path 600 for restoration pseudowires, coupled to each of the three interfaces. The network node 12 further comprises a second internal routing path 610 for traffic pseudowires, also coupled to each of the three interfaces but separate from the first internal routing path. This means that a traffic pseudowire on the second internal routing path 610 cannot cross over onto the first internal routing path 600. In this example, the first internal routing path 600 and the second internal routing path 610 each comprises a VPLS (Virtual Private LAN service) bridge. However, other arrangements are possible.

According to an embodiment of the present invention, a computer program product may be configured to, when run on a computer (which may also be referred to as a processor) perform any of the methods described above, in particular with reference to FIGS. 3a and 3b. The computer program product may be stored on a computer readable medium. Alternatively, the computer program product may, for example, be in the form of a downloadable signal.

According to an embodiment of the present invention, a network node 12 for a MPLS ring network (10, 18) is operable to perform any of the methods described above, in particular with reference to FIGS. 3a and 3b.

Figure 7:
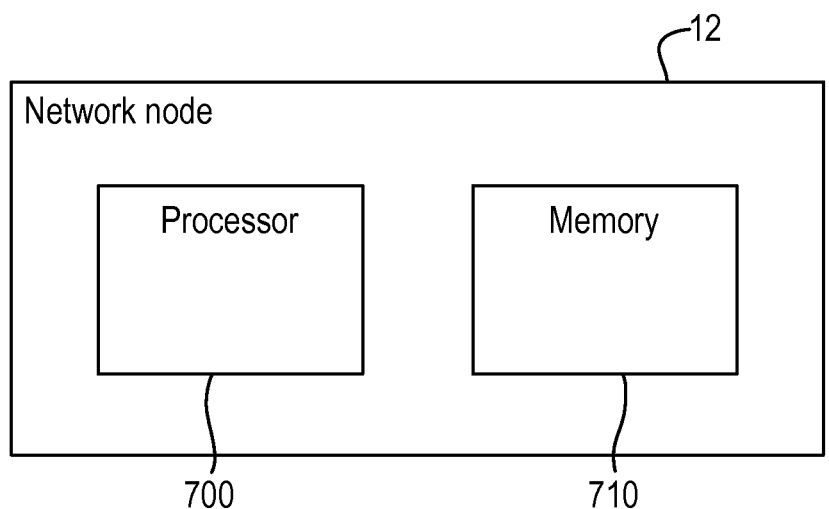
FIG. 7 illustrates a network node according to an embodiment of the present invention.

FIG. 7 illustrates a network node 12 for a MPLS ring network 10 according to an embodiment of the present invention. The network node 12 comprises a processor 700 and a memory 710. The memory 710 may, for example, be a semiconductor memory. The memory 710 may be volatile or non-volatile. The processor 700 may for example be a general purpose computer, such as a Central Processing Unit (CPU). The processor 700 may comprise one or more integrated circuits (not shown). The processor 700 may be programmable. In some embodiments, the processor 700 may comprise several modules, integrated to any degree.

According to a first aspect of the present invention, the processor 700 is configured to detect a failure along a network link traversed by a first Label Switched Path (LSP) which is terminated at the network node. The processor 700 is further configured to, in response to the detection, encapsulate an Ethernet Ring Protocol (ERP) restoration message in a restoration pseudowire. The processor 700 is further configured to transmit the restoration pseudowire within a second LSP over a subsequent network link.

According to preferred embodiments of the present invention, the processor 700 may further be configured to detect a failure along the network link traversed by the first LSP by detecting the failure using the Bidirectional Forwarding Detection (BFD) protocol. The processor 700 may also be configured to detect a failure along the network link traversed by the first LSP by detecting that the performance of the network link is below a threshold. The processor 700 may further be configured to insert an identifier in header information of the restoration psuedowire, the identifier indicating that the pseudowire carries an ERP restoration message.

According to a second aspect of the present invention, the processor 700 is configured to receive a first Label Switched Path (LSP) comprising a pseudowire. The processor 700 is further configured to detect that the pseudowire is a restoration pseudowire comprising an Ethernet Ring Protocol (ERP) restoration message. The processor 700 is further configured to, in response to the detection, process the ERP restoration message.

According to preferred embodiments of the present invention, the processor 700 may be further configured to detect that the pseudowire is a restoration pseudowire by detecting an identifier in header information of the pseudowire, the identifier indicating that the pseudowire carries an ERP restoration message. The processor 700 may be configured to process the ERP restoration message by at least one of blocking or unblocking traffic from travelling along a second LSP over a subsequent network link. The processor 700 may alternatively be configured to process the ERP restoration message by forwarding the restoration pseudowire encapsulating an ERP restoration message for transmission within a second LSP over a subsequent network link.

According to preferred embodiments of the first and second aspects of the present invention, the processor 700 may further be configured to transmit a traffic pseudowire within the second LSP. In relation to the second aspect of the present invention, the processor 700 may be configured to receive a traffic pseudowire within the first LSP, and to forward the traffic pseudowire for transmission within the second LSP. According to a preferred embodiment of both aspects of the present invention, the network node 12 may comprise a first internal routing path and a second, separate internal routing path (not shown), wherein the processor is configured to forward the traffic pseudowire over the first internal routing path and to forward the restoration pseudowire over the second internal routing path. The first and second internal routing paths may be bridges, for example VPLS bridges.

According to a preferred embodiment of the second aspect of the present invention the processor 700 is configured to forward the traffic pseudowire in dependence on the ERP restoration message.

Figure 8A:
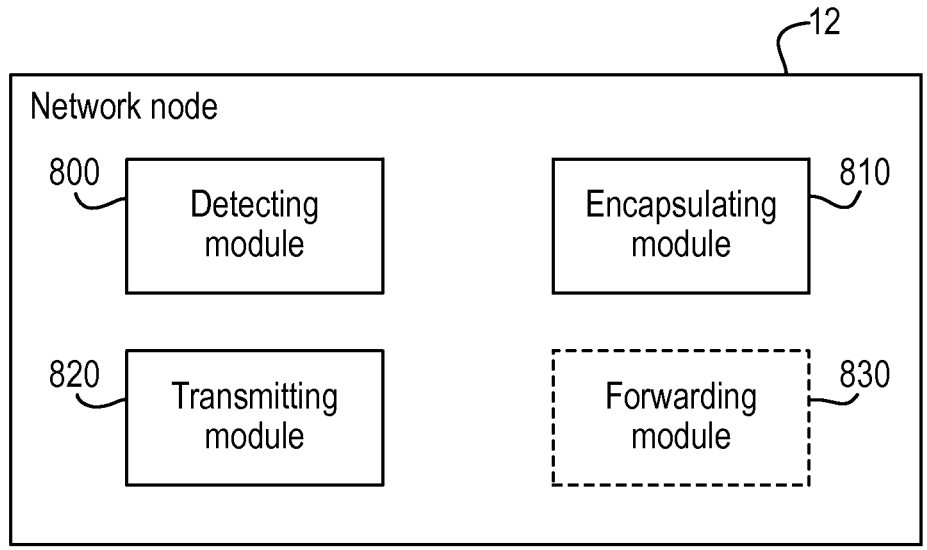
FIGS. 8a and 8b illustrate a network node according to embodiments of the present invention.
Figure 8B:
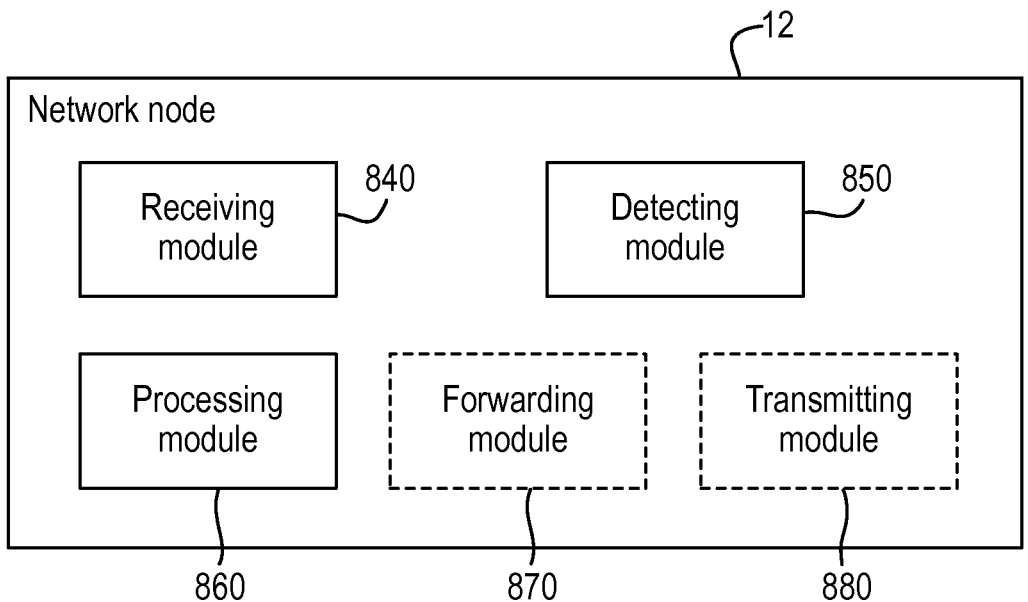

FIGS. 8*a* and 8*b* illustrate a network node 12 for an MPLS ring network according to a further embodiment of the present invention. The network node 12 in FIG. 8*a* and the network node 12 in FIG. 8*b* may be the same network node 12.

The network node 12 shown in FIG. 8*a* comprises a detecting module 800, an encapsulating module 810 and a transmitting module 820. The network node 12 may also optionally include a forwarding module 830. Each of these modules 810, 820, 830 may comprise any combination of hardware and software. For example, each of the modules 810, 820, 830 may comprise a processor and a memory as described above. The modules 810, 820, 830 may be integrated to any degree.

According to an embodiment of the present invention, the detecting module 800 is for detecting a failure along a network link traversed by a first Label Switched Path (LSP) which is terminated at the network node. The encapsulating module 810 is for, in response to the detection, encapsulating an Ethernet Ring Protocol (ERP) restoration message in a restoration pseudowire. The transmitting module 820 is for transmitting the restoration pseudowire within a second LSP over a subsequent network link.

According preferred embodiments of the present invention, the detecting module 800 may be for detecting the failure using the Bidirectional Forwarding Detection (BFD) protocol. The detecting module 800 may be for detecting that the performance of the network link is below a threshold. The encapsulating module 810 may further be for inserting an identifier in header information of the restoration psuedowire, the identifier indicating that the pseudowire carries an ERP restoration message.

The network node 12 shown in FIG. 8*b* comprises a receiving module 840, a detecting module 850, and a processing module 860. The network node 12 may optional further comprise a forwarding module 870 and a transmitting module 880. Each of these modules 840, 850, 860, 870, 880 may comprise any combination of hardware and software. For example, each of the modules 840, 850, 860, 870, 880 may comprise a processor and a memory as described above. The modules 840, 850, 860, 870, 880 may be integrated to any degree.

According to an embodiment of the present invention, the receiving module 840 is for receiving a first Label Switched Path (LSP) comprising a pseudowire. The detecting module 850 is for detecting that the pseudowire is a restoration pseudowire comprising an Ethernet Ring Protocol (ERP) restoration message. The processing module 860 is for, in response to the detection, processing the ERP restoration message.

According to preferred embodiments of the present invention, the detecting module 850 may be for detecting an identifier in header information of the pseudowire, the identifier indicating that the pseudowire carries an ERP restoration message. Further, the processing module 860 may be for at least one of blocking or unblocking traffic from travelling along a second LSP over a subsequent network link. The processing module 860 may in addition or alternatively be for forwarding the restoration pseudowire for transmission within a second LSP over a subsequent network link.

According to embodiments of the present invention, the transmitting module 820 and 880, in the network node 12 shown in FIG. 8*a* and or 8*b*, may be for transmitting a traffic pseudowire within the second LSP. In the network node 12 shown in FIG. 8*b*, the receiving module 840 may further be for receiving a traffic pseudowire within the first LSP. The forwarding module 870 may be for forwarding the traffic pseudowire received within the first LSP for transmission within the second LSP. The network node 12 may comprising a first internal routing path and a second, separate internal routing path. The first and second internal routing paths may be bridges, for example VPLS bridges. The forwarding module 870 may be for forwarding the traffic pseudowire over the first internal routing path and for forwarding the restoration pseudowire over the second internal routing path.

According to a preferred embodiment of the present invention, the forwarding module 870 in the network node 12 shown in FIG. 8*a* may be for forwarding the traffic pseudowire in dependence on the ERP restoration message.

According to preferred embodiments of the present invention, in relation to the network node 12 shown in FIG. 7, and FIGS. 8*a* and 8*b*, the second LSP may be one of a plurality of LSPs having an end point at the network node 12, wherein the first LSP is associated with the second LSP.

Further the network node 12 may be at least one of an ingress network node for the traffic or an egress network node for traffic. The network node 12 may comprise, for example, a first interface (not shown) for receiving a first LSP over a network link of the MPLS ring network, and a second interface (not shown) for transmitting a second LSP over a subsequent (i.e. further, or different) network link in the MPLS ring network. The network node 12 may further comprise a third interface for receiving traffic for transmission in the MPLS ring network and or for dropping traffic from the MPLS ring network.

According to preferred embodiments of the present invention, the ERP restoration message may comprise a Ring Automatic Protection Switching (R-APS) message. According to preferred embodiments of the present invention, the ERP restoration message may be defined according to ITU-T G.8032.

The first LSP and or the second LSP may be bidirectional, whereby a pseudowire may be transmitted in a clockwise direction or an anticlockwise direction over the LSP. The restoration pseudowire, and optionally the one or more traffic pseudowires, may have a spoke configuration.

According to an embodiment of the present invention, the network node 12 may be coupled to a further MPLS ring network.

According to an embodiment of the present invention, a MultiProtocol Label Switching (MPLS) ring network 10, for example as described above, comprises a path for traffic around the ring, the path comprising a plurality of sequential Label Switched Paths (LSPs). The MPLS ring network 10 may comprise a plurality of network nodes as described above, for example with respect to FIG. 7 or FIGS. 8a and 8b.

Thus, embodiments of the present invention have the advantage that they may provide quicker, more reliable and more efficient restoration of an MPLS ring network in the event of a network link failure. By virtue of transmitting ERP restoration messages within LSPs, restoration may be provided more quickly than in Ethernet networks. Furthermore, embodiments of the present invention require fewer LSPs than the currently proposed solution for providing restoration of an MPLS ring network, and thus advantageously, put a lower load on the management system. Embodiments of the present invention also, advantageously, do not require a "wrap back" of traffic in the event of a network link failure. Thus, network resources consumed to route traffic in the event of a network link failure may be minimised. The approach of the present invention further, advantageously, facilitates transportation of multicast traffic over an MPLS ring network and can be used in a multi-ring MPLS network, where two MPLS ring networks share a common link.

The invention claimed is:

1. A method for restoring a MultiProtocol Label Switching (MPLS) ring network in the event of a network link failure, wherein the MPLS ring network comprises a path for traffic around the ring comprising a plurality of sequential Label Switched Paths (LSPs), the method comprising, at a network node in the MPLS ring network:
   detecting a failure along a network link traversed by a first LSP having an end point at the network node;
   in response to the detecting, encapsulating an Ethernet Ring Protocol (ERP) restoration message in a restoration pseudowire; and
   transmitting the restoration pseudowire within a second LSP over a subsequent network link,
   wherein encapsulating the ERP restoration message in the restoration pseudowire further comprises inserting an identifier in header information of the restoration pseudowire, the identifier indicating that the pseudowire carries an ERP restoration message.

2. A method according to claim 1, wherein detecting a failure along the network link traversed by the first LSP comprises detecting the failure using the Bidirectional Forwarding Detection (BFD) protocol.

3. A method according to claim 1, wherein detecting a failure along the network link traversed by the first LSP comprises detecting that the performance of the network link is below a threshold.

4. A method according to claim 1, further comprising transmitting a traffic pseudowire within the second LSP.

5. A method according to claim 4, wherein the restoration pseudowire is separate from the traffic pseudowire.

6. A method according to claim 1, wherein the second LSP is one of a plurality of LSPs having an end point at the network node, and wherein the first LSP is associated with the second LSP.

7. A method according to claim 1, wherein the network node is at least one of an ingress network node for the traffic or an egress network node for the traffic.

8. A method according to claim 1, wherein the ERP restoration message comprises a Ring Automatic Protection Switching (R-APS) message.

9. A method according to claim 1, wherein the ERP restoration message is defined according to ITU-T G.8032.

10. A method according to claim 1, wherein at least one of the first LSP and the second LSP is bidirectional.

11. A method according to claim 1, wherein at least one of the restoration pseudowire and the traffic pseudowire has a spoke configuration.

12. A nontransitory computer-readable medium comprising a computer program product configured to, when run on a computer, perform a method for restoring a MultiProtocol Label Switching (MPLS) ring network in the event of a network link failure, wherein the MPLS ring network comprises a path for traffic around the ring comprising a plurality of sequential Label Switched Paths (LSPs), the method comprising, at a network node in the MPLS ring network:
   detecting a failure along a network link traversed by a first LSP having an end point at the network node;
   in response to the detecting, encapsulating an Ethernet Ring Protocol (ERP) restoration message in a restoration pseudowire; and
   transmitting the restoration pseudowire within a second LSP over a subsequent network link,
   wherein encapsulating the ERP restoration message in the restoration pseudowire further comprises inserting an identifier in header information of the restoration pseudowire, the identifier indicating that the pseudowire carries an ERP restoration message.

13. A network node for a MultiProtocol Label Switching (MPLS) ring network, the network node comprising a processor and a memory, wherein the processor is configured to:
   detect a failure along a network link traversed by a first Label Switched Path (LSP) which is terminated at the network node;
   in response to the detection, encapsulate an Ethernet Ring Protocol (ERP) restoration message in a restoration pseudowire; and
   transmit the restoration pseudowire within a second LSP over a subsequent network link,
   wherein the processor is further configured to insert an identifier in header information of the restoration pseudowire, the identifier indicating that the pseudowire carries an ERP restoration message.

14. A network node according to claim 13, wherein the processor is configured to detect a failure along the network link traversed by the first LSP by detecting the failure using the Bidirectional Forwarding Detection (BFD) protocol.

15. A network node according to claim 13, wherein the processor is configured to detect a failure along the network link traversed by the first LSP by detecting that the performance of the network link is below a threshold.

16. A network node according to claim 13, wherein the processor is further configured to transmit a traffic pseudowire within the second LSP.

17. A network node according to claim 16, wherein the restoration pseudowire is separate from the traffic pseudowire.

18. A network node according to claim 13, wherein the second LSP is one of a plurality of LSPs having an end point at the network node, and wherein the first LSP is associated with the second LSP.

19. A network node according to claim 13, wherein the network node is at least one of an ingress network node for the traffic or an egress network node for the traffic.

20. A network node according to claim 13, wherein the ERP restoration message comprises a Ring Automatic Protection Switching (R-APS) message.

21. A network node according to claim 13, wherein the ERP restoration message is defined according to ITU-T G.8032.

22. A network node according to claim 13, wherein at least one of the first LSP and the second LSP is bidirectional.

23. A network node according to claim 13, wherein at least one of the first LSP and the second LSP has a spoke configuration.

24. A network node according to claim 13, wherein the network node is coupled to a further MPLS ring network.

25. A network node for a MultiProtocol Label Switching (MPLS) ring network, the network node comprising:
- a detecting module for detecting a failure along a network link traversed by a first Label Switched Path (LSP) which is terminated at the network node;
- an encapsulating module for, in response to the detection, encapsulating an Ethernet Ring Protocol (ERP) restoration message in a restoration pseudowire; and
- a transmitting module for transmitting the restoration pseudowire within a second LSP over a subsequent network link,
- wherein the encapsulating module is further configured to insert an identifier in header information of the restoration pseudowire, the identifier indicating that the pseudowire carries an ERP restoration message.

* * * * *